Jan. 7, 1964 E. HIRSHFIELD ETAL 3,117,193

SELF-NORMALLING VIDEO JACK

Filed July 6, 1961 3 Sheets-Sheet 1

INVENTORS
EDWARD HIRSHFIELD
JOSEPH D. RUPRECHT

BY Abraham A. Saffitz

ATTORNEY

Jan. 7, 1964 E. HIRSHFIELD ETAL 3,117,193

SELF-NORMALLING VIDEO JACK

Filed July 6, 1961 3 Sheets-Sheet 2

INVENTORS
EDWARD HIRSCHFIELD
JOSEPH D. RUPRECHT

BY Abraham A. Saffitz

ATTORNEY

Jan. 7, 1964 E. HIRSHFIELD ETAL 3,117,193

SELF-NORMALLING VIDEO JACK

Filed July 6, 1961 3 Sheets-Sheet 3

INVENTORS
EDWARD HIRSHFIELD
JOSEPH D. RUPRECHT

BY Abraham A. Saffitz

ATTORNEY

1

2

3,117,193

SELF-NORMALLING VIDEO JACK

Edward Hirshfield, Washington, D.C., and Joseph D. Ruprecht, Silver Spring, Md., assignors, by mesne assignments, to Vitro Corporation of America, New York, N.Y., a corporation of Delaware Filed July 6, 1961, Ser. No. 122,208

10 Claims. (Cl. 200—51.09)

The invention relates to a novel form of a self-normaling jack used for connecting a busy video channel to an open channel. The jack is particularly adapted to serve as a two position switch; in one position, a video channel is connected to another for transmission purposes and in a second position, an alternative signal source is substituted for the initial one which is simultaneously terminated in its characteristic impedance.

In the prior art, devices intended to achieve a more convenient means for video-program channel testing without disrupting necessary connections could not be employed at frequencies above 40 megacycles (approximately). Moreover, these same devices do not provide anywhere near the degree of channel isolation or voltage standing-wave ratio inherent to the invention presented here.

The only material published known to us in the telephone art which shows a single unit providing for testing and connecting is of the type developed for telephone distribution and is that which is shown and described in Principles and Practices of Telephony, Toll Equipment and Traffic and Trucking, Mitchell, 1923, page 158 and FIGURE 49.

Our self-normaling video jack is not of the telephone type described in the aforementioned publication. A synthetic plastic block of low dielectric constant (preferably polystyrene), is dimensioned and connected to provide a minimum of crosstalk interference between the incoming busy channel and the outgoing open and test channels which are switched through the jack. The crosstalk interference value measured with this invention is down at least 60 db for frequencies between D.C. and 260 megacycles and is down at least 90 db for frequencies below 40 megacycles.

An important feature of the invention is the novel, simplified, movable switch structure of the jack which leads to improved performance and minimizes maintenance during continuous and long use. The switch consists of a movable elongated member (rod or bar) which in combination with the spring loaded low dielectric block is the only moving part. Positive switching action is provided in either direction.

The spring-loaded dielectric block is rigidly secured to the movable push rod which moves as a unit when the plug is inserted and, due to the action of the spring, retracts when the plug is removed.

This movable switch structure rides on silver plated electrical spring contacts. Specifically, a silver-plated insert in the switch member is in positive mechanical engagement with spring contacts which, in the normal position, conduct an electrical signal from the incoming to the outgoing channel. When a plug is inserted into a jack, the incoming signal is terminated in the characteristic impedance of its generator. At the same time, the outgoing channel is fed the signal supplied through the plug.

A further feature of the invention is that the number of resilient spring contacts is kept to a minimum, there being at least one spring contact placed on each side of the block. Spring contacts are provided to serve as guides for precision push-pull movement (push by spring expansion) without a wobbling of the block which would cause haphazard electrical connections. The contacts are mounted within the housing so that their pressure bears constantly against the block.

A feature of the invention which improves the operation and ease of handling is the construction of the coaxial connector which provides a positive frictional holding of the inserted test probe against the bias of the spring loaded block and push rod unit. The construction also insures good electrical contact between the probe and connector. The probe is held by resilient fingers in a sleeve portion of the outer conductor which are biased to bear inwardly against the outer conductor of the test probe; also, by providing slots in an inner sleeve (the center conductor) which are bowed inwardly, the probe is frictionally held in place.

A type of self-normaling video jack made by Columbia Broadcasting System is shown in the October, 1959, issue of the Journal of the Society of Motion Picture and Television Engineers, vol. 68, pages 675–677.

In the CBS jack referred to above, the two incoming channels are connected through two normally engaging contacts one of which is movable. When the test probe is inserted, a lever with a dielectric extension pushes the movable contact away to engage a third contact so that one incoming channel is led to a dissipating terminating resistance located outside the jack and the other channel is connected to receive the signal from the test probe. With the CBS test probe inserted, the distance between the two normally engaging contacts of the jack is about 3/16" to 1/4".

Although this distance is sufficient to prevent crosstalk at lower frequencies, at higher video and lower radio frequencies, the crosstalk level due to the effect of interelectrode capacitance between the contacts becomes rather high and limits its useful frequency range. Moreover, in the CBS jack, the arms of the two contacts are separated by screw-mounted blocks. Because the screw is insulated by a conventional, thin sleeve, the mounting screw itself increases crosstalk due to interelectrode capacitance between the screw and the two contact arms.

Another disadvantage of the CBS jack is the high frequency loss and high voltage standing wave ratios (VSWR) caused by discontinuties in the lead and capacitance and inductance to ground. Inert non-corrosive type contacts (e.g., gold) are used in this jack.

The present invention overcomes these difficulties by providing a self-normaling video jack which is compact and self-contained in a tidy package. The terminal resistance is mounted in the socket housing which is rugged and reliable. The construction permits the use of contacts of the self-wiping type which operates to remove any oxide, which might be formed. Such contacts are both economical and reliable. Crosstalk is reduced to a minimum over a wide frequency range by maintaining wide separation between the parallel coaxial channels and thin associated contacts and conductors. Capacitance to ground and inductance are kept to a minimum because the conductors are very short in length and appropriately positioned.

As a result of the simplified housing construction and the unitary movable block-rod combination, the video jack switch is easy to assemble, rugged in design and construction, and easy to handle and repair. Another feature of the invention is the use of self-wiping contacts and a conductor which affords more economical construction, longer life and greater reliability.

In a preferred form of the invention, a rectangular socket housing is provided with a spring-biased, low dielectric block and longitudinally positioned push rod. Resilient contacts are located on each side of the socket housing for connection to coaxial lines. The resilient contacts are yielding urged against the low dielectric block for constant contact. A coaxial connector is mounted on a socket for receiving a test probe. Conductors are in each instance embedded or mounted in recesses in the block so that, when the block and push rod are moved, a change occurs in the connections between the coaxial lines and coaxial output due exclusively to the change in position of the block and the conductors.

For a further understanding of the nature and object of the invention, reference should be made to the following detailed description taken in connection with the accompanying drawings in which.

Figure 7:
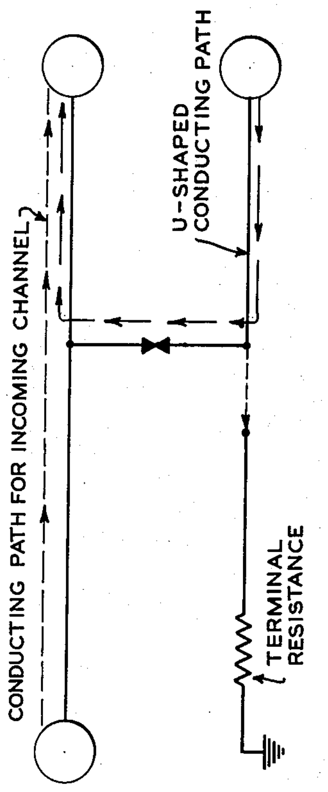
FIG. 7 is a circuit diagram of the invention.

For a better understanding of the circuits established by the switching action of the video jack plug of the invention, reference is made first to FIG. 7. The solid line labeled "U-shaped conducting path" indicates the conduction path through the "cross conductor" connecting the incoming channel and outgoing channel when the video jack is in its normal position. When it is desired to test the outgoing channel by utilizing a sample signal from the "test probe," the "test probe" is inserted and the video jack switches to its second or test position to establish the circuit flow paths as indicated by the dashed lines. In the second position, the path from the incoming or busy channel to the open or outgoing channel through the "cross conductor" is broken. Thus, the signal from the "incoming channel" is conducted as indicated by the dashed line labeled "conducting path for incoming channel" to the "terminal resistance" which dissipates the signal power and to ground. The signal from the "test probe" flows through the "conducting path for test probe signal' to the outgoing channel. Thus, in the test or second position, two separate, electrically isolated conducting paths are established.

Figures 1, 5:
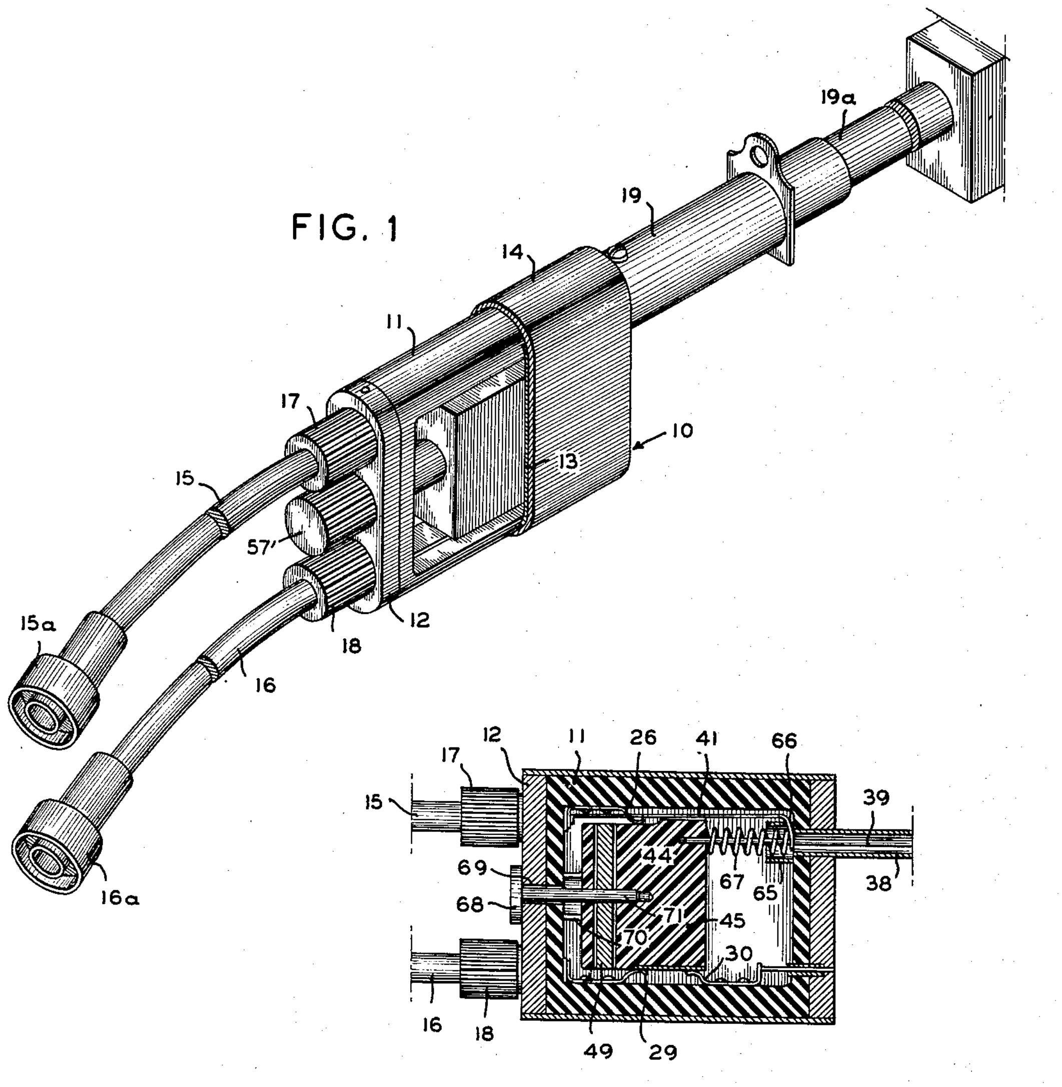
FIG. 1 shows the video jack in perspective.
FIG. 5 shows an embodiment of the jack of FIGS. 2 and 3.

FIG. 1 shows the video self-normaling jack 10 of the invention in perspective. A socket housing 11 is made of insulating material such as Bakelite and is substantially rectangular in cross-section. The socket housing has brass caps 12 fitted over each end and secured thereto. A shield 13 covers the hollow portion of the socket housing on each flat side thereof and is welded, soldered, or brazed to the brass end caps 12. Shield 13 prevents field loss and leakage. An external covering 14 (shown partially cut away) in the form of a sheath is of strong, conductive material such as steel or copper to further prevent field loss and leakage and also to protect the socket. Covering 14 fits snugly over the socket 11. Parallel coaxial conductors 15 and 16 having ends 15*a* and 16*a* for connection to video components, are suitably fastened to the jack by connectors 17 and 18. A coaxial connector member 19 is also suitably fastened to the other of the brass end caps 12 (invisible under covering 14). Sleeve 19 is designed to conveniently fit standard viedo test equipment with which this invention may be used.

Figure 2:
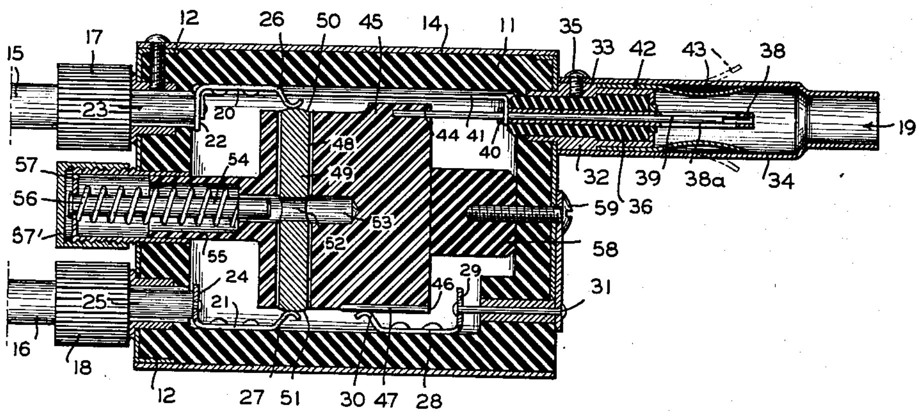
FIGS. 2 and 3 are sections of FIG. 1 and show the video jack in the normal and test positions, respectively.

FIG. 2 is a section of the jack of FIG.1. Similar numbers for similar parts will be used throughout in the figures. The insulated socket housing is at 11, and its inside hollow portion is substantially rectangular in shape. Near one end of the hollow portion of socket housing 11 on opposite surfaces thereof are similarly constructed contacts 20 and 21 suitably fastened by pins to the socket housing 11. Contact 20 has an arm 22 to which the inner conductor 23 of coaxial line 15 is soldered to provide an electrical connection therewith. Arm 24 of contact 21 is connected to inner conductor 25 of coaxial line 16 in a similar manner. Contacts 20 and 21 also have resilient arms 26 and 27, respectively. Near the end of the hollow portion of the socket opposite to contact 21 is another contact 28 having arm 29 and resilient arm 30. Contact 28 is similar to contacts 20 and 21 in construction.

A terminal resistance 31 grounded at one end is suitably fastened to socket housing 11. The other end of terminal resistance 31 is soldered to arm 29 of contact 28 for electrical connection therewith.

A coaxial connector for receiving the test probe shown generally at 19 is fastened to the socket housing. Coaxial connector 19 is of convenient size and shape to be usable with video test probe equipment. Connector 19 is anchored to the socket housing by a sleeve-shaped anchor member 32 welded or brazed to brass end cap 12. Anchor member 32 has threaded holes as indicated at 33. A connector sleeve 34 fits over the anchor 32 and is secured thereto by screws 35 which are received by holes 33. The dielectric separator of the coaxial connector is shown at 36, the outer conductor at 37, and the inner conductor, which is a sleeve, at 38.

Figure 4:
FIG. 4 shows an element of the invention.

As shown in FIG. 4, inner conducting sleeve 38 has longitudinal slots 38*a* therein. The sleeve wall is constructed to be bowed inwardly so that the radius of the sleeve is smaller in its middle region. A push rod 39 is longitudinally slidable in sleeve 38 and is in frictional engagement therewith in the middle region of sleeve 38.

The end 40 of sleeve 38 extends into the hollow portion of socket 11, a conductor 41 is soldered thereto to provide an electrical connection therewith. The other end of conductor 41 is soldered to contact arm 22 and inner conductor 23 of coaxial line 15. Conductor 41 thereby provides an electrical conduction path between inner conductor 23 and inner sleeve conductor 38.

A sleeve 42 having outwardly biased resilient fingers 43 (shown in dotted lines in FIG. 2) is fastened as by welding or other suitable means to outer conductor 37. When connector sleeve 34 is fitted over fingers 43, the fingers are forced inwardly against their bias and are in the bowed position shown in FIG. 2.

Figure 3:
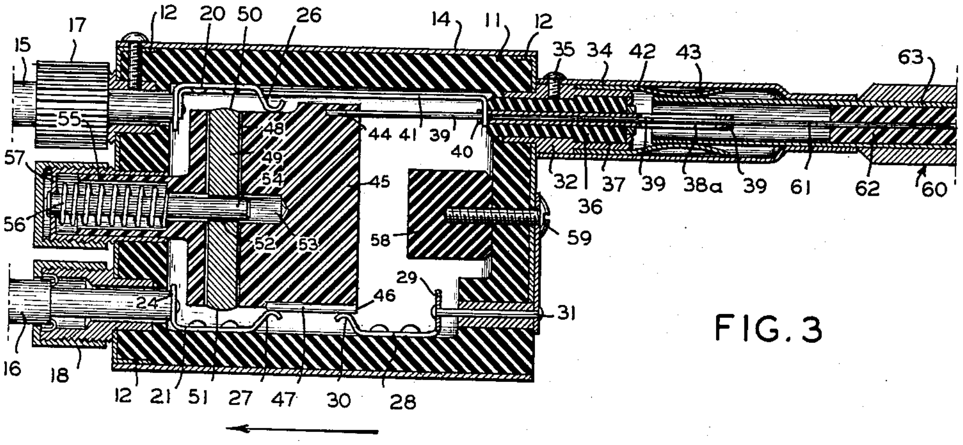

A previously explained, member 39 is longitudinally slidable. One end 44 of push rod 39 is rigidly secured to a separating and switching block 45 made of material having a low dielectric constant such as polystyrene. Thus, block 45 slides with member 39 as a unit. Low dielectric block 45 serves to insure electrical separation between conducting elements with a minimum of crosstalk. As shown in FIGS. 2 and 3, end 44 of member 39 is preferably embedded in block 45.

Low dielectric block 45 slides on, and is always in contact with, resilient arms 26, 27 and 30 of contacts 20, 21 and 28, respectively, which are yieldingly urged against block 45.

At the corner edge of the block 45 below end 44 of push rod 39 there is provided a bridge conductor 46, which may be partially embedded in the low dielectric switching and separating block 45. A longitudinal surface 47 is exposed from the block 45. The bridge conductor 50 adapted to contact surface 47 may be made of a suitable hard metal conductor and is preferably coated or plated with silver to improve the conduction to the conductor 46.

The block 45 also has a vertical bone 48 into which a highly conductive transverse member 49 is secured or embedded. Conductor 49 may be a silver plated or coated brass bar or rod. Transverse conductor 49 has ends 50 and 51 which protrude slightly from the edge of the block 45 for a self-wiping coaction with contacts engageable therewith.

As shown in FIG. 2, transverse conductor 49 has a bore 52 crosswise through its middle portion. A longitudinal bore 53 crosses vertical bore 48 of block 45 so that the two bores are in mutual communication. As shown in FIG. 3, a grounding rod-shaped conductor 54 is loosely fitted into the longitudinal bore 53 so that when block 45 slides, the bore 53 is moved therewith and passes along the grounding conductor 54. The cross bore 52 of transverse conductor 49 fits rather snugly about grounding conductor 54 so that an electrical connection is established between transverse conductor 49 and grounding conductor 54.

The non-electrically conducting relationship of transverse conductor 49 to grounding conductor 54 is shown in FIG. 2 for the condition when switching and separating block is in a first or normal position connecting the incoming and outgoing channels.

In the test position shown in FIG. 3, block 45 has been moved to the left or test position as indicated by the arrow, thereby establishing the electrical connection between the transverse and grounding conductors 49 and 54.

In order to insure a positive return of block 45, a sleeve 55 integral with block 45 provides a housing for coil spring 56. Sleeve 57 receives sleeve 55. Sleeve 57 is threaded on the outside for capping and for tight electrical connection with transverse conductor 49 which is rolled over to fit snugly on a hole provided in end of sleeve 57.

When a force is applied to slide block 45 to the left, spring 56 is compressed as shown in FIG. 3. When the force is removed, block 45 returns to the position shown in FIG. 2. An insulated stop 58 secured to the socket housing 11 by screw 59 serves to limit the return movement of block 45.

The force mentioned above to cause block 45 to slide is supplied by the manual insertion of a test probe into the coaxial connector. The test probe is shown generally at 60 in FIG. 3 in the test position where it has been fully inserted into coaxial connector 19.

The test probe has an inner conductor 61, separating dielectric 62 and outer conductor 63. When inserted into the coaxial connector 19, the inner conductor 61 fits snugly into inner conducting sleeve 38 and the bowed portion thereof and is pushed against push rod 39, causing member 39 and block 45 to move together as a unit to the left against spring 56 as indicated by the arrow in FIG. 3. During movement, the outer conductor 63 of the test probe bears against the fingers 43, thus insuring a tight fit of the probe and preventing the spring 56 from forcing block 45 to return until the probe is withdrawn.

In operation, in the normal position of the self-normaling jack 10 the connectors 15*a* and 16*a* are connected to two video components having terminals at a video jackfield. The resulting conduction path will be through one of the coaxial lines, say outgoing line 15, inner conductor 23 of coaxial line 15, through contact arms 22 and 26 of contact 20, through transverse conductor 49, through contact arms 27 and 24 of contact 21, inner conductor 25 of coaxial line 16, and coaxial line 16. Thus, in its normal position, the jacket of the present invention provides a U-shaped conduction path from one video channel to another.

When it is desired to test coaxial line 15, the test equipment indicated in FIG. 1 as being connected to coaxial line 19*a* is connected to the self-normaling video jack 10 by inserting test probe 60 into the coaxial connector 19. As hereinbefore described, the insertion of probe 60 causes push rod 39 and block 45 to be pushed from the normal position of FIG. 2 in the direction of the arrow of FIG. 3 to test position. Thus, by the movement of a single sliding member, the jack is switched from a normal position to a test position.

In the test position the conduction path from coaxial line 15 is through conductor 41 to contact 40 through inner conducting sleeve 38 to the inner conductor 61 and the coaxial line of the test probe shown at 60. Any power from incoming coaxial line 16 will be dissipated in the terminal resistance 31. The conduction path from coaxial line 16 is through inner conductor 25, contact arms 24 and 27 of contact 21, conductor 46 in block 45 and contact arms 30 and 29 of contact 28 to the terminal resistance 31 and to ground.

Another embodiment of the invention is shown in FIG. 5. The electrical connections are exactly the same as those described in the embodiment of FIGS. 2 and 3, but the mechanical elements have been modified. Parts the same as those of the other figures are given the same numeral designations.

As shown in FIG. 5, the stop slidable member 39 slides in conducting sleeve 38. A tension spring 67 preferably made of non-conductive or insulated material is suitably anchored to block 45 and to the socket housing 11. An insulated sleeve 65 which serves as a stop member (replacing the stop member 58 and screw 59 assembly of FIGS. 2 and 3) is suitably secured as by bonding or welding to the socket housing. Sleeve 65 surrounds push rod 39 and serves as a guide for tension spring 67. A hole 66 is bored into the cylindrical wall of sleeve 65 to serve as a passage for conductor 41. With this arrangement, the slidable unit of block 45 and push rod 39 is moved into the test position (shown in FIG. 5) against the return bias of a tension spring—here spring spring 67—with the same effective result as in the arrangement of FIGS. 2 and 3.

The tension spring 67 replaces the compression spring 56 of FIGS. 2 and 3, and therefore eliminates the need for the sleeve arrangement 57 and 55 of FIGS. 2 and 3. Thus, as shown in FIG. 5, sleeve 70 is a shortened version of sleeve 55 of FIGS. 2 and 3. A screw 69 suitably received by brass end cap 12 and socket housing 11 and having a large head 68, has an extended portion which is ground conductor 71. Ground conductor 71 serves exactly the same purpose as ground conductor 54 of FIGS. 2 and 3, is suitably anchored as by welding or bonding to screw 69, or may be an integral portion therewith.

The motion of block 45 is equivalent to that of FIGS. 2 and 3. In response to the insertion or withdrawal of the test probe, the block 45 slides over resilient contact arms 26, 29 and 30 which are yieldingly urging against block 45. The block is constrained from sidewise motion by push rod 39 and ground conductor 71.

With the test probe in the test position of FIG. 3, it will be appreciated that the transverse conductor 49 is effectively grounded through grounding conductor 71. In this position the transverse conductor 49 acts as a partial shield between the parallel coaxial conductors 15 and 16 and inner conductors 23 and 25 and contacts 20 and 21, thereby aiding in the minimizing of crosstalk.

Figure 6:
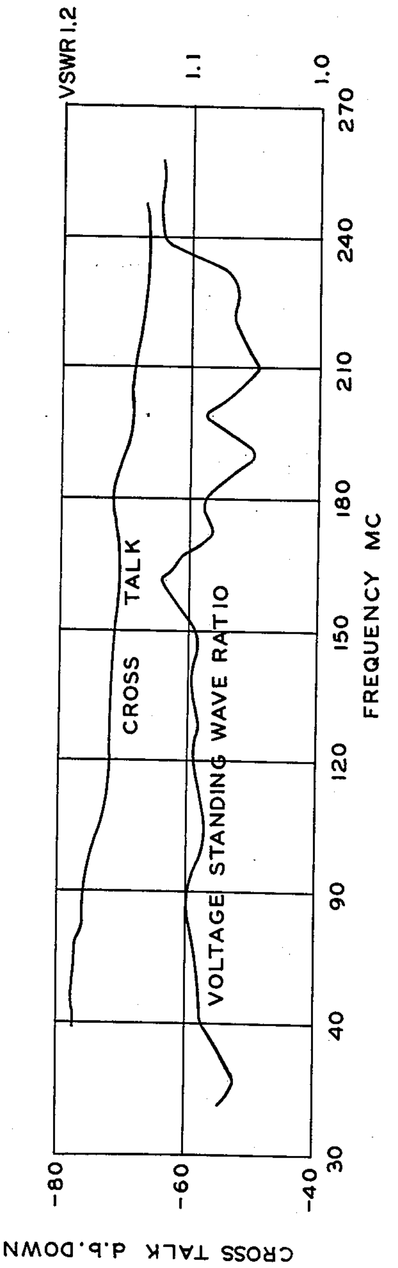
FIG. 6 is a graph showing the operating characteristics of the invention.

The graph of FIG. 6 shows the experimental results achieved with the self-normaling video jack of the invention. The ordinate axes represent the crosstalk in decibels down, and VSWR (voltage standing wave ratio). The abscissa represents the frequency in megacycles. The VSWR is seen to be well below 1.2 across the band, and the crosstalk figure is below −60 db at the highest frequency tested which represents outstanding performance over the frequency range.

As an example, the results as indicated on the graph of FIG. 6 were obtained by using certain apparatus of the invention having the following dimensions and characteristics:

| | | | | | |
|---|---|---|---|---|---|
| Switching and Separating Block 45 | Maximum height, 1.00″. | Minimum height, 9.68″. | Maximum length, 1.375″. | Minimum length, .875″. | Thickness, .437″. |
| Insulated Socket Housing 11 | Outside length, 2.187″. | Outside width, 1.625″. | Inside length at center line, 1.937″. | Depth, 0.500″. | |
| Brass end Cap 12 | Thickness, 0.190″. | | | | |
| Terminal Resistance 31 | Rated at ½ watt. | | | | |

Although in the foregoing example polystyrene is used for the block, there may also be used any low dielectric constant material such as a block of polyethylene, and a block of a mixture of 75% polytetrafluorethylene and 25% calcium fluoride. Indeed, the material may be defined as being selected from the group consisting of polytetrafluorethylene, polychlorotrifluorethylene, high molecular weight polyethylene, irradiated polyethylene, polystyrene, polydichlorostyrene, polyvinyl dibenzofuran, styrene-polyester resin, vinyl carbazole resin, polyisobutylene, polycarbonate resin and mixtures of said resins with each other and with dielectric fillers.

Each of the resins have good physical electrical and mechanical properties for this dielectric use. The suitable dielectric fillers such as calcium fluoride, titanium dioxide, etc., are well known in the art.

It is to be understood that changes and variations may be made without departing from the spirit and scope of the invention as defined in the appended claims.

We claim:

1. A self-normaling video jack comprising a socket housing having input connections therein for coaxial video lines, a coaxial connector having electrical connections in said socket housing for receiving a test probe, a member having conducting paths therein and slidable in said housing to first and second positions, said slidable member when in said first position establishing a U-shaped conducting path for said coaxial lines and in said second position establishing a conducting path between one of said coaxial lines and said coaxial connector, said coaxial connector including inner and outer coaxial resilient sleeve members, a test probe insertable into one of said sleeve members for frictional engagement therewith, a push rod slidable in the other of said sleeve members, said slidable member including a block having a low dielectric constant to which said push rod is secured to move therewith as a unit, a plurality of conductors in crossed relation on said block for establishing said U-shaped conducting path upon slidable movement of the test probe and said block.

2. Apparatus according to claim 1 wherein said slidable member is a block of polystyrene.

3. Apparatus according to claim 1 wherein said slidable member is a block of polyethylene.

4. Apparatus according to claim 1 wherein said slidable member is a block of a mixture of 75% polytetrafluorethylene and 25% calcium fluoride.

5. Apparatus according to claim 1 wherein said slidable member is a block of a material selected from the group consisting of polytetrafluorethylene, polychlorotrifluorethylene, high molecular weight polyethylene, irradiated polyethylene, polystyrene, polydichlorostyrene, polyvinyl dibenzofuran, styrene-polyester resin, vinyl carbazole resin, polyisobutylene, polycarbonate resin and mixtures of said resins with each other and with dielectric fillers.

6. In a self-normaling video jack having connections therein for connecting a busy program channel to coaxial lines including an open channel when in a normal position, means for switching said coaxial lines so that the open channel may be connected to test apparatus comprising a socket housing, a coaxial connector attached to said socket housing and having means for receiving a test probe; a member having conductive paths embedded therein and slidable in said socket housing responsive to the insertion of the test probe in said coaxial connector; said slidable member when in said first position establishing a U-shaped conducting path for said coaxial lines and in said second position establishing a conducting path between one of said coaxial lines and said coaxial connector and resilient contacts mounted in said socket for establishing connections between one of said coaxial lines and the test probe when the slidable member is moved, said coaxial connector including inner and outer coaxial resilient sleeve members, a test probe insertable into one of said sleeve members for frictional engagement therewith, a push rod slidable in the other of said sleeve members, said slidable members including a block having a low dielectric constant to which said push rod is secured to move therewith as a unit, a plurality of conductors in crossed relation on said block for establishing said U-shaped conducting path upon slidable movement of the test probe and said block.

7. A self-normaling video jack for coaxial lines terminating at a program distribution panel comprising a socket housing substantially rectangular in cross-section and enclosing a substantially rectangular space; a metallic end cap secured to each end of the socket housing; electrical connections at one end of the socket housing for a busy and open coaxial line, said lines being parallel; a coaxial connector for receiving a coaxial test probe at the other end of said socket housing; inner and outer coaxial resilient sleeve members in said coaxial connector for receiving the inner and outer connectors respectively of said coaxial test probe in frictional engagement therewith when the test probe is inserted, said inner resilient sleeve member surrounding the inner conductor of said test probe; a push rod longitudinally slidable in said inner resilient sleeve member of the coaxial connector; a block of material having a low dielectric constant longitudinally slidable in said space of the socket housing, said push rod and said block being rigidly secured to each other so that they slide as a unit, said unit being spring biased to a normal position; first and second resilient contacts mounted on opposite sides of said socket housing and electrically connected to said coaxial lines, a terminal resistance mounted on one end of said socket housing; a third resilient contact mounted on said socket housing adjacent said terminal resistance, said resilient contacts providing yielding surfaces engaging said low dielectric block; a conductor connecting said first resilient contact with said coaxial connector; a transverse conductor having a crosswise hole embedded in said block and engageable at each end with two of said resilient contacts; a longitudinal hole in said block crossing said transverse conductor; a grounding conductor secured to said socket housing and surrounded by said longitudinal hole and a bridging conductor mounted along part of one side of said block and adapted to provide a conducting path between said second and third resilient contacts; whereby when said test probe is inserted into said coaxial connector, said unit of the slidable push rod and block slides to a test position and is held therein, and one of said coaxial lines is grounded by said terminal resistance, and the other coaxial line is electrically connected to said test probe.

8. In a self-normaling video jack a switch having normal and test positions comprising a socket housing having a plurality of electrical contacts mounted thereon with input connections to coaxial video lines and a coaxial connector for receiving a test probe, said coaxial connector having inner and outer flexible sleeve members; a block having a low dielectric constant and also having conductors embedded therein engageable with said contacts, said block being slidable in said socket housing; a test probe secured to said block and slidable therewith for engaging said coaxial connector; resilient means biasing said block to the normal position and means to move said test probe against the bias of said resilient means and hold it in the test position whereby the electrical contacts are switched, said test probe being insertable into one of said flexible sleeve members, a push rod slidable in the other of said sleeve members, a plurality of conductors in crossed relation on said block establishing a U-shaped conducting path upon slidable movement of the test probe and said block.

9. Apparatus according to claim 8 wherein said resilient means is a compression spring.

10. Apparatus according to claim 8 wherein said resilient means is a tension spring.

References Cited in the file of this patent

UNITED STATES PATENTS

| | | |
|---|---|---|
| 2,729,709 | Bertrand | Jan. 3, 1956 |
| 2,771,529 | Kostriza | Nov. 20, 1956 |
| 3,001,053 | Rubin | Sept. 19, 1961 |
| 3,020,365 | Neenan | Feb. 6, 1962 |
| 3,059,073 | French | Oct. 16, 1962 |

FOREIGN PATENTS

| | | |
|---|---|---|
| 1,123,391 | France | June 11, 1956 |